United States Patent [19]
Goltsin et al.

[11] 3,803,073
[45] Apr. 9, 1974

[54] PROCESS FOR PREPARING FIBER-FORMING SOLUTIONS ON THE BASE OF ACRYLONITRILE

[76] Inventors: Boris Emmanuilovich Goltsin, ul. Mayakovskogo, 36/38, kv. 10; Konstantin Leibovich Glazomitsky, ul. Zhukovskogo, 13, kv. 8; Khaim Samoilovich Roskin, pr. Stachek, 59, kv. 86; Evgeny Nikolaevich Rostovsky, Torzhkovskaya ul., 14, kv. 12, all of Leningrad; Victor Nikitich Antonov, pr. Mira, 118-a, kv. 165, Moscow; Michail Michailovich Koton, Moskovsky pr., 171, kv. 66, Leningrad; Eros Alexandrovich Kulev, pr. Lenina, 65, kv. 12, Gorkovskaya obl. Dzershinsk; Galina Petrovna Belonovskaya, ul. Vosstania, 53, kv. 4, Leningrad; Vladimir Vasilievich Darvin, Belgradskaya ul., 27, korp. 2, kv. 32, Leningrad; Revekka Moiseevna Minkova, Nevsky Prospekt, 6, kv. 10, Leningrad, all of U.S.S.R.

[22] Filed: July 28, 1971

[21] Appl. No.: 166,966

Related U.S. Application Data

[63] Continuation-in-part of Ser. No. 748,906, July 31, 1968, abandoned.

[52] U.S. Cl. 260/29.6 AN, 260/78.5 R, 260/85.5 D, 260/85.5 L, 260/88.7 D, 260/88.7 E
[51] Int. Cl. C08f 3/76, C08f 15/22, C08f 45/24
[58] Field of Search.. 260/85.5 R, 85.5 AM, 85.5 F, 260/85.5 D, 85.5 N, 78.5, 29.6 AN, 88.7

[56] References Cited
UNITED STATES PATENTS

| | | | |
|---|---|---|---|
| 3,399,177 | 8/1968 | Reeder et al. | 260/85.5 R |
| 3,483,172 | 12/1969 | Shibukawa et al. | 260/85.5 AM |
| 2,606,893 | 8/1952 | Reynolds et al. | 260/85.5 F |
| 2,679,494 | 5/1954 | Thomas | 260/85.5 AM |
| 2,558,730 | 7/1951 | Cresswell | 260/85.5 AM |
| 3,065,211 | 11/1962 | Milford et al. | 260/85.5 R |
| 2,741,652 | 4/1956 | Miller | 260/85.5 R |

*Primary Examiner*—Harry Wong, Jr.
*Attorney, Agent, or Firm*—Waters, Roditi, Schwartz & Nissen

[57] ABSTRACT

A process for preparing fiber-forming solutions by means of polymerization of acrylonitrile or copolymerization of the latter with one of the monomers of the type of vinyl esters, acrylic or methacrylic esters, acrylamides or methacrylamides, their methylol derivatives, unsaturated dibasic acids or their salts.

The process is conducted in an aqueous concentrated solution of thiocyanate in the presence of cumene hydroperoxide and polyalkylene polyamine.

5 Claims, No Drawings

PROCESS FOR PREPARING FIBER-FORMING SOLUTIONS ON THE BASE OF ACRYLONITRILE

This application is a continuation-in-part of our application Ser. No. 748,906, filed July 31, 1968, now abandoned.

This invention relates to processes for preparing fiber-forming solutions of acrylonitrile polymers. Such solutions can be kept for a long time and used, when necessary, for producing synthetic fibers of the type of "nitron" (USSR), "orlon" (USA), "vonnel" (Japan), etc.

A method of preparing fiber-forming solutions of acrylonitrile copolymers by means of polymerization or copolymerization of acrylonitrile in a 51.5 percent aqueous thiocyanate solution with the use of azo-bis-isobutylonitrile initiator at a temperature of about 80°C is known.

A method of preparing fiber-forming copolymer solutions by means of polymerization or copolymerization of acrylonitrile in a 51.5 percent sodium thiocyanate solution under the action of isopropyl benzene hydroperoxide within a temperature range of from 40 to 60°C is also known.

Despite all the advantages of said methods, the high temperature of the reaction decreases the molecular weight of the polymer and limits the number of monomers which can be used for copolymerization of acrylonitrile. This is particularly true for monomers having highly reactive functional groups.

The object of the present invention is to provide a process for preparing spinning solutions within a lower polymerization temperature range from about 0°C to +20°C.

The above-mentioned object has been accomplished by providing a process for the polymerization of acrylonitrile or copolymerization of the latter with monomers having various highly reactive functional groups. In order to provide the fiber-forming properties the copolymer, the acrylonitrile is introduced in an amount not less than 85 mol. percent.

The present process is carried out by means of polymerization of acrylonitrile or copolymerization of the latter with at least one monomer of the group involving vinyl esters, acrylic or methacrylic esters, acrylamides or methacrylamides, their methylol derivatives, unsaturated dibasic acids or their salts in an aqueous concentrated solution of thiocyanate in the presence of an initiator. According to the present invention, there is used, as an initiator, a redox system consisting of cumene hydroperoxide and polyalkylene polyamine taken in a weight ratio of 1 to 1. The redox system may be more effective in the presence of compounds capable of forming iron ions, e.g. iron salts.

In accordance with the present invention the process is accomplished as follows.

A solution of thiocyanate and a mixture of monomers are charged into a reaction vessel. Air is withdrawn from the vessel by blowing argon or purified nitrogen therethrough. Then cumene hydroperoxide and polyalkylene polyamine are added and the mixture is stirred for an hour and a half in a temperature range from about 0°C to 20°C, depending on the comonomer used. The reaction results in a transparent viscid solution. The unreacted monomers are regenerated in the usual way.

The present process makes it possible to use comonomers having highly reactive groups and to control the properties of the acrylonitrile copolymers. In particular, the copolymerization of acrylonitrile with N-methylol methacrylamide results in a highly hydrophilized copolymer. The fibers spun from such a copolymer have high physical and mechanical characteristics (breaking tenacity up to 50 grams per tex, elongation about 15 percent and adsorption about four times higher than in fibers spun of pure polyacrylonitrile). These fibers exhibit a high and stable dyeability with respect to most of the known commercial dye-stuffs.

Such fibers can be turned into a "cross-linked" state, if necessary. In this case their thermostability increases by 100°C in comparison with fibers of polyacrylonitrile. The cross-linked fibers are insoluble in any known solvent.

The present process for polymerization or copolymerization of acrylonitrile, which is carried out at room temperature and results in a direct preparation of spinning solutions, is quite advantageous from the economical point of view in comparison with the known methods.

For a better understanding of the present invention by those skilled in the art, the following examples are presented by way of illustration.

Example 1

The copolymerization was conducted in an inert gas (argon or nitrogen) while stirring. 15 weight parts of acrylonitrile, 2.4 weight parts of N-methylol methacrylamide (total weight of monomers was about 15 percent of the weight of thiocyanate solution), 0.522 weight part of cumene hydroperoxide and 0.522 weight part of polyalkylene polyamine were added to 100 weight parts of a saturated aqueous solution of sodium thiocyanate (48.5 weight parts of water, 51.5 weight parts of NaCNS, $d_4^{20} = 1.31$). The process of copolymerization lasted 1 hour and a half at a temperature of about 20°C. The reaction resulted in a homogeneous slightly yellowish transparent viscid solution suitable for fiber spinning. The copolymer could also be precipitated with water or acetone. The copolymer yield was about 82 percent, viscosity 1.9.

In this and all the following examples the viscosity is given as intrinsic.

In this and the other examples the term "polyalkylene polyamide" is to be understood as a mixture of various compounds mainly consisting of ethylene diamine, diethylene triamine, triethylene tetramine and small amounts (5–10 weight percent) of similar compounds having high molecular weights.

We have a fraction having a boiling range of 90–95°C at a residual pressure of 15 mm of mercury column.

Example II

The polymerization was conducted under conditions of Example I with the exception that in addition to the compounds mentioned in Example I Mohr's salt (0.01 percent of the total weight of the monomers) was added. The reaction lasted 1 hour. The copolymer yield was 70 percent, viscosity 1.8.

Example 3

The copolymerization was conducted under the conditions of Example I with the exception that 5.7 weight parts of acrylonitrile and 0.8 weight part of methacrylamide were added as monomers. The copolymer yield was 65 percent, viscosity 1.7.

Example IV

The polymerization was conducted under the conditions of Example I with the exception that only acrylonitrile in an amount of 15 weight parts was taken as a monomer. The polymer yield was 70 percent, viscosity 2.11.

Example V

The copolymerization was conducted under the conditions of Example I with the exception that 9.2 weight parts of acrylonitrile and 0.8 weight part of methylmethacrylate were taken as comonomers. The copolymer yield was 71 percent, viscosity 1.75.

Example VI

The copolymerization was conducted under the conditions of Example I with the exception that 9.2 weight parts of acrylonitrile, 0.6 weight part of methylacrylate and 0.2 weight part of itaconic acid were taken as comonomers. The copolymer yield was 60 percent, viscosity 1.6.

Example VII

The copolymerization was conducted under conditions of Example I with the exception that 5.7 weight parts of acrylonitrile and 0.56 weight part of vinylacetate were taken as comonomers. The copolymer yield was 71 percent, viscosity 1.6.

Example VIII

The copolymerization was conducted under conditions of Example II with the exception that only acrylonitrile in an amount of 15 weight parts was taken as a monomer. The polymer yield was 72 percent, viscosity 2.5.

What we claim is:

1. A process for preparing fiber-forming solutions comprising homopolymerizing acrylonitrile in an aqueous concentrated solution of thiocyanate in the presence of a redox system consisting of cumene hycroperoxide and polyalkylene polyamine in a weight ratio of 1:1 at a temperature of about 0° to 20°C.

2. A process as claimed in claim 1, wherein iron salts are introduced into the redox system.

3. A process for preparing fiber-forming solutions comprising copolymerizing not less than 85 mol percent of acrylonitrile with not more than 15 mol percent of at least one comonomer selected from the group consisting of vinyl esters; acrylic and methacrylic esters; acrylamides and methacrylamides, and their methylol derivatives; and unsaturated dibasic acids and their salts in an aqueous concentrated solution of thiocyanate in the presence of an initiating redox system consisting of cumene hydroperoxide and polyalkylene polyamine in a weight ratio of 1:1 at a temperature of about 0° to 20°C.

4. A process as claimed in claim 3, wherein iron salts are introduced into the redox system.

5. A process as claimed in claim 3, wherein the comonomer is N-methylol methacrylamide.

* * * * *